April 2, 1940.  H. A. ORAHOOD ET AL  2,195,900
TERMINAL FOR STORAGE BATTERY CABLES
Filed July 11, 1939
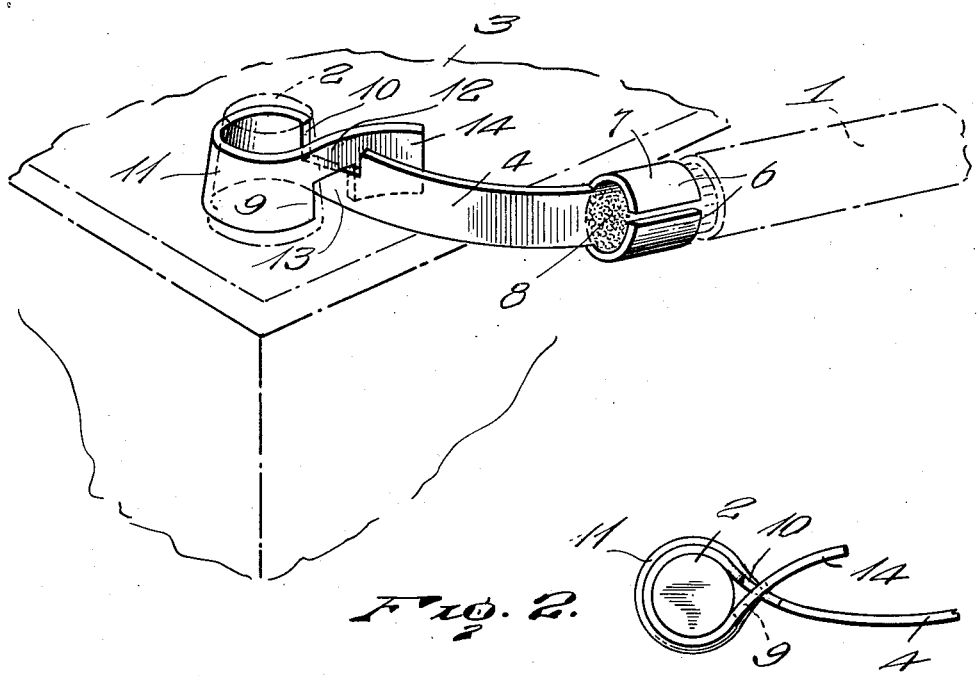
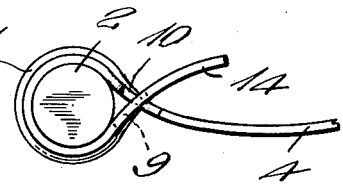
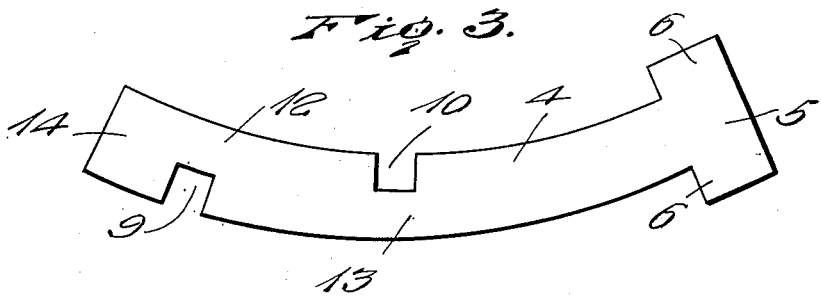
INVENTORS
H.A. Orahood and
BY G.A. Reed.
Ross J. Woodward, ATTORNEY Patented Apr. 2, 1940

2,195,900

UNITED STATES PATENT OFFICE 2,195,900

TERMINAL FOR STORAGE BATTERY CABLES

Harley A. Orahood and George A. Reed, Telluride, Colo.

Application July 11, 1939, Serial No. 283,910

1 Claim. (Cl. 173—259)

This invention relates to a terminal for a storage battery cable and it is one object of the invention to provide a device of this character which consists of a strip of resilient sheet metal and is so formed that it may be firmly secured about the end of the cable and tightly but detachably engaged about a battery post in such a manner that corroding, due to improper contact between the post and terminal will be prevented.

Another object of the invention is to provide a terminal so formed that one end constitutes a post encircling loop adapted to be expanded by means of a pair of pliers and then disposed about the post and released so that it may contract tightly about the post.

Another object of the invention is to so form the loop-forming portion of the sheet metal strip that expansion and contraction of the loop will be limited and also the free end of the loop-forming portion of the strip so formed that it may be firmly grasped by the pliers used for expanding the loop.

Another object of the invention is to provide a terminal formed from a strip of sheet metal of such shape that a loop formed therefrom will be tapered upwardly and thus caused to conform to and fit closely about a tapered battery post.

The invention is illustrated in the accompanying drawing, wherein:

Figure 1 is a perspective view showing the improved terminal in use.

Figure 2 is a top plan view showing the looped end of the terminal engaged about a battery post.

Figure 3 is a view of the sheet metal blank from which the terminal is formed.

This improved terminal is employed as means for connecting a conductor cable 1 with the post 2 of a battery 3.

The strip 4 of resilient metal from which the terminal is formed, is curved longitudinally, as shown in Figure 3 of the drawing, and, at its rear end, is formed with a cross head 5 providing side arms 6 which, when bent as shown in Figure 1, form a sleeve 7 in which the bared end portions of the wires 8 of the cable are firmly gripped. A notch or recess 9 leads from one side edge of the strip 4 in spaced relation to the outer front end of the strip and another recess 10 leads from the other side edge of the strip, the recess 10 being spaced from the recess 9 longitudinally of the strip. By locating the recesses in spaced relation to each other and the recess 9 in spaced relation to the front end of the strip, the formed portion of the strip may be bent to form a loop 11 and the portions 12 and 13 engaged through the recesses to limit expansion and contraction of the loop and also maintain the loop in its proper shape during expanding and contracting thereof. In view of the fact that the strip 4 is curved longitudinally, the loop tapers toward its upper end and will fit snugly in close contacting engagement with the battery post 2 which tapers toward its upper end and is of frustoconical formation. The portion 14 of the strip between the recess 9 and its front end, forms a tongue or ear extending from the recess 10 in such relation to the shank of the terminal that the shank and tongue may be engaged between the jaws of a pair of pliers and pressure applied to shift the tongue toward its shank and expand the loop. The loop may then be disposed about the battery post and the pliers removed to allow the loop to contract tightly about the post. When the terminal is to be removed, the pliers will again be applied and pressure exerted to expand the loop until it may be easily removed from the post. The tongue will then be released and the loop contract to its normal diameter which is limited by the portions 12 and 13 passing through the recesses.

While the terminal is formed of resilient sheet metal so that the loop may be expanded and then contract about the terminal post of a battery, the sheet metal strip will be coated with lead or an equivalent corrosion-resisting metal to prevent corrosion from accumulating about the battery post and the loop of the terminal.

In view of the fact that the terminal includes in its construction an expansible and contractable loop for engaging about a battery post, this eliminates use of bolts or screws which are liable to become corroded and render it difficult to remove the terminal from the post. This also eliminates likelihood of damage to the terminal or the post through efforts to remove a corroded bolt or screw. It often happens that when attempting to remove a bolt or screw, the battery post or the terminal will be broken, whereas when the improved terminal is to be removed, it is merely necessary to apply pressure with a pair of pliers to expand the loop. The improved terminal may be easily and quickly applied or removed without the use of special tools as the loop may be expanded by means of a convenient pressure applying tool such as a pair of pliers or a small wrench. Since the terminal is formed of sheet metal which may be stamped from sheet metal stock, the cost of manufacture is very low and the terminal may be cheaply made and sold at a small price.

Having thus described the invention, what is claimed is:

A battery cable terminal formed from a strip of resilient conductive metal having at one end means for attaching it to a bared end portion of a battery cable, said strip being curved longitudinally and formed with longitudinally spaced front and rear recesses leading from opposite side edges of the strip out of opposed relation to each other and of appreciably greater length than the thickness of the strip, the forward portion of said strip being bent to form the strip into an elongated shank having a loop at its front end for engaging about a battery post, said loop being open at its top and bottom and tapered toward its upper end for fitting snugly about a tapered battery post, the portion of the strip between each recess and the opposite side edge of the strip being loosely engaged through the other recess and movable thereon longitudinally of the shank to guide and limit expansion and contraction of the loop, and the portion of the strip between the forward recess and the front end of the strip constituting an ear extending rearwardly from the loop in diverging relation to the shank and adapted to be engaged between jaws of pliers together with an adjacent portion of the shank and forced toward the shank to expand the loop when force is exerted on the shank and ear.

HARLEY A. ORAHOOD.
GEORGE A. REED.